United States Patent
Sugiyama (10) Patent No.: US 8,261,178 B2
(45) Date of Patent: Sep. 4, 2012

(54) AUDIO DATA DISTRIBUTION SYSTEM AND METHOD FOR GENERATING A PHOTO SLIDESHOW WHICH AUTOMATICALLY SELECTS MUSIC

(75) Inventor: Nobukazu Sugiyama, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 885 days.

(21) Appl. No.: 12/232,209

(22) Filed: Sep. 12, 2008

(65) Prior Publication Data
US 2010/0070057 A1    Mar. 18, 2010

(51) Int. Cl.
*G06F 17/00* (2006.01)
*G06F 3/00* (2006.01)
(52) U.S. Cl. ........... 715/203; 715/730
(58) Field of Classification Search ........... 715/203
See application file for complete search history.

(56) References Cited

U.S. PATENT DOCUMENTS

| | | | | |
|---|---|---|---|---|
| 7,805,129 | B1 * | 9/2010 | Issa et al. | 455/412.1 |
| 2003/0058781 | A1 * | 3/2003 | Millikan et al. | 369/272 |
| 2004/0100487 | A1 * | 5/2004 | Mori et al. | 345/724 |
| 2006/0171374 | A1 * | 8/2006 | Deshpande | 370/352 |
| 2006/0224703 | A1 | 10/2006 | Sugimoto | |
| 2008/0256100 | A1 * | 10/2008 | van de Sluis et al. | 707/100 |
| 2009/0094518 | A1 * | 4/2009 | Lawther et al. | 715/716 |

FOREIGN PATENT DOCUMENTS

| | | |
|---|---|---|
| EP | 1 821 306 A2 | 8/2007 |
| GB | 2 406 991 | 4/2005 |

* cited by examiner

*Primary Examiner* — Doug Hutton, Jr.
*Assistant Examiner* — Andrew McIntosh
(74) *Attorney, Agent, or Firm* — Haverstock & Owens LLP (57) ABSTRACT

An embodiment of the present invention relates to a method, system, or program that automatically associates background music with an image slideshow. The embodiment can receive a selected image collection, extract metadata from the image collection, and associate audio files with the image collection based on the metadata. The embodiment will then prompt concurrent playing of the audio file while the image collection is displayed. The metadata identifies a theme for the image collection which can form the basis for associating the audio file with the image collection.

16 Claims, 7 Drawing Sheets

AUDIO DATA DISTRIBUTION SYSTEM AND METHOD FOR GENERATING A PHOTO SLIDESHOW WHICH AUTOMATICALLY SELECTS MUSIC

BACKGROUND OF THE INVENTION

1. Field of the Invention

This invention relates generally to selecting background music for a variety of images, and more particularly to a system and method for automatically selecting music based on information associated with a series of images selected by a user at a client computer.

2. Description of the Related Art

Conventional music playing devices automatically associate audio files on a user's hard-drive or portable device with images relating to the audio files. For example, various audio devices and software will associate an audio file with its artist or album. This software employs information found in the metadata and file name of the music file in combination with information on a local or remote database to identify images related to the artist or album associated with the music file. Once identified, the software will commonly display images associated with the audio file while playing the audio file. These images may be retrieved from a local drive or a remote internet location.

To select an image associated with an audio file, the audio play software requires the audio file to contain metadata directly associating the image with the audio file. This allows the audio playing software to uniquely select an image using the audio file metadata.

Alternatively, image presentation software and image album software generally allows a user to combine multiple images into a complete slideshow or album. The software may also allow the user to combine viewing of the images with audio content including short or long duration audio content to provide themes or information relating to the visual content of the presentation or album.

However, the process of including music with an image presentation or album is a manual process beyond the capabilities of the conventional user. For example, in order to produce an audio/visual presentation, the software generally requires the user to associate images with audio. Creating this association involves manually assembling the image content and audio content for the presentation and, using the software to arrange the image content and identify instances in time where the audio content should begin and end.

SUMMARY OF THE INVENTION

The present invention provides a system that enables a user to listen to background music during a photo slideshow without manually specifying individual audio files. The system automatically selects music based on metadata, such as date, filename, etc., to identify audio content related to photo slideshow images. The audio file may be located on a local drive or may be located somewhere on a network. Furthermore, the system may employ network services to identify and obtain audio content relating to the image or collection of images.

A first example embodiment of the present invention may be directed to a method for automatically associating background music with an image slideshow. The method may including receiving a selected image collection, extracting metadata from the image collection, associating an audio file with the image collection based upon the metadata, and prompting a concurrent playing of the audio file while the image collection is displayed. The metadata may identify a theme for the image collection which can form the basis for associating the audio file with the image collection.

The metadata may include, for example, file names, dates, folder names, and the location information (e.g., GPS information or a location name), or any information that can stored in or determined from the images in the image collection.

A second embodiment of the present invention may include system that automatically associates background music with an image slideshow. The system may include an interface that receives an image collection, an extraction module that extracts metadata from the image collection, an audio file information database, and an audio player that concurrently plays the audio file while the image collection is displayed. The audio file database may include an association module that identifies themes for images in the image collection based on the extracted metadata and uses the theme as the basis for associating audio files with the image collection.

A third embodiment of the present invention may include a computer program for automatically associating background music with an image slideshow, stored on at least one computer readable medium. The computer program may cause a computer to receive a selected image collection, extract metadata from the image collection, associate an audio file with the image collection based upon the metadata, and prompt concurrent playing of the audio file while the image collection is displayed An alternative embodiment may include a method, system, or program that may associate the image collection with a playlist including songs having a theme similar to the theme or themes identified in the metadata.

Yet another alternative embodiment may include a method, system, or program that may associate the image collection with a radio station having at least one theme similar to the theme or themes identified in the metadata.

The present invention can be embodied in various forms, including business processes, computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 1:
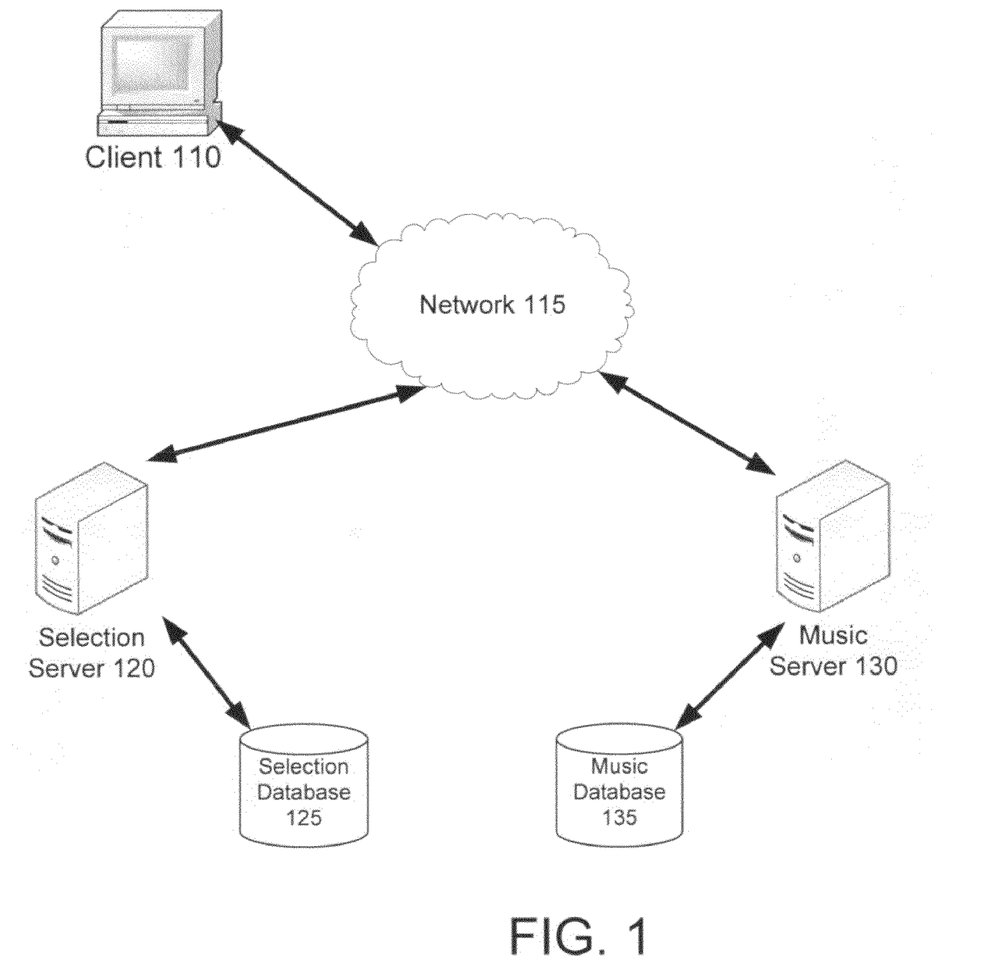
FIG. 1 illustrates a network component diagram of an example embodiment of an Audio Data Distribution System in accordance with the present invention.

FIG. 1 illustrates a network component diagram of an example embodiment of an Audio Data Distribution System 100 in accordance with the present invention. It should be understood that various embodiments of the Audio Data Distribution System 100 may include a variety of components, information types, and interactions, including but in no way limited to those explicitly disclosed herein.

Audio Data Distribution System 100 includes a Client 110 which communicates with a Selection Server 120 and Music Server 130 over a network 115.

Selection Server 120 may selectively communicate with a Selection Database 125, possibly through network 115, but more likely though a local area network (LAN), or the like. Selection Server 120 may include or may be in communication with Selection Database 125, containing data for associating audio data, such as files, streams, etc., with metadata from an image collection. The image collection includes images selected or grouped as a result of activity at Client 110.

Selection Server 120 and Selection Database 125 may be included within a single computing device, or may each include clusters of computing devices for purposes of redundancy, processing efficiency, etc. In any event, Selection Database 125 may include data associating image meta-data with audio data. In one embodiment, the audio data is in the form of audio files, but one of ordinary skill will easily recognize that the audio data may be implemented with audio streams, or other transmittable formats.

Music Server 130 may selectively communicate with a Music Database 135, possibly through network 115, but more likely though a local area network (LAN), or the like. Music Server 130 and Music Database 135 may alternatively be included within a single computing device, or may each include clusters of computing devices for purposes of redundancy, processing efficiency, etc. In any event, Music Database 135 may be searched to identify and retrieve audio files.

A Client 110 provides a mechanism by which a user or a software application can communicate through network 115, e.g., to interact with Selection Server 120 and Music Server 130. For example, Client 110 may be any one of a number of computing devices that includes one or more software applications. For example, Client 110 may include a desktop computer, a laptop computer, a mini-computer, a cell phone, personal digital assistant, or other similar device. Also, while only one Client 110 is shown in FIG. 1, many different Clients 110 may submit queries and receive responses using system 100.

Network 115 may include any medium or media for transmitting data between Client 110, Selection Server 120, and Music Server 130, such as the Internet, a local area network, wide area network, cellular network, etc.

Software on Client 110 submits queries to Selection Server 120 and Music Server 130 via network 115. For example, Client 110 may communicate with the Selection Server 120 to identify audio files based on image files selected by the user of Client 110. Selection Server 120 and Music Server 130 may accept queries submitted by Client 110 and may in turn query databases 125 and 135. Selection Server 120 and Music Server 130 may be any device or combination of devices configured to receive information from one or more Clients 110. Selection Server 120 and Music Server 130 may include one or more web servers or online services, which may facilitate access to Client 110, e.g., Microsoft Internet Information Service, Apache, or the like. Alternatively, Selection Server 120 and Music Server 130 may include proprietary internet services. Selection Server 120 and Music Server 130 may interface with Client 110 using Hypertext Markup Language (HTML), Extensible Markup Language (XML), or other protocol for transmitting query parameters for databases 125 and 135. Further, Client 110 may display various kinds of user interfaces for selecting and identifying image or image collections.

Selection Database 125 and Music Database 135 may include one or more relational databases. Alternatively or additionally, databases 125 and 135 may include one or more object-oriented or hierarchical databases, or other mechanisms for storing and accessing data, including arrays, pointers, flat files, etc. As mentioned above, Selection Database 125 may be a separate computing device from Selection Server 120, or may be a software application executing on Selection Server 120. Similarly, Music Database 135 may be a separate computing device than Music Server 130, or may be a software application executing on Music Server 125.

Computing devices such as those discussed herein generally each include instructions executable by one or more processors. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Databases or data stores described herein may include various kinds of mechanisms for storing, accessing, and retrieving various kinds of data, including a hierarchical database, a set of files in a file system, an application database in a proprietary format, a relational database management system (RDBMS), etc. Each such database or data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

Figure 2:
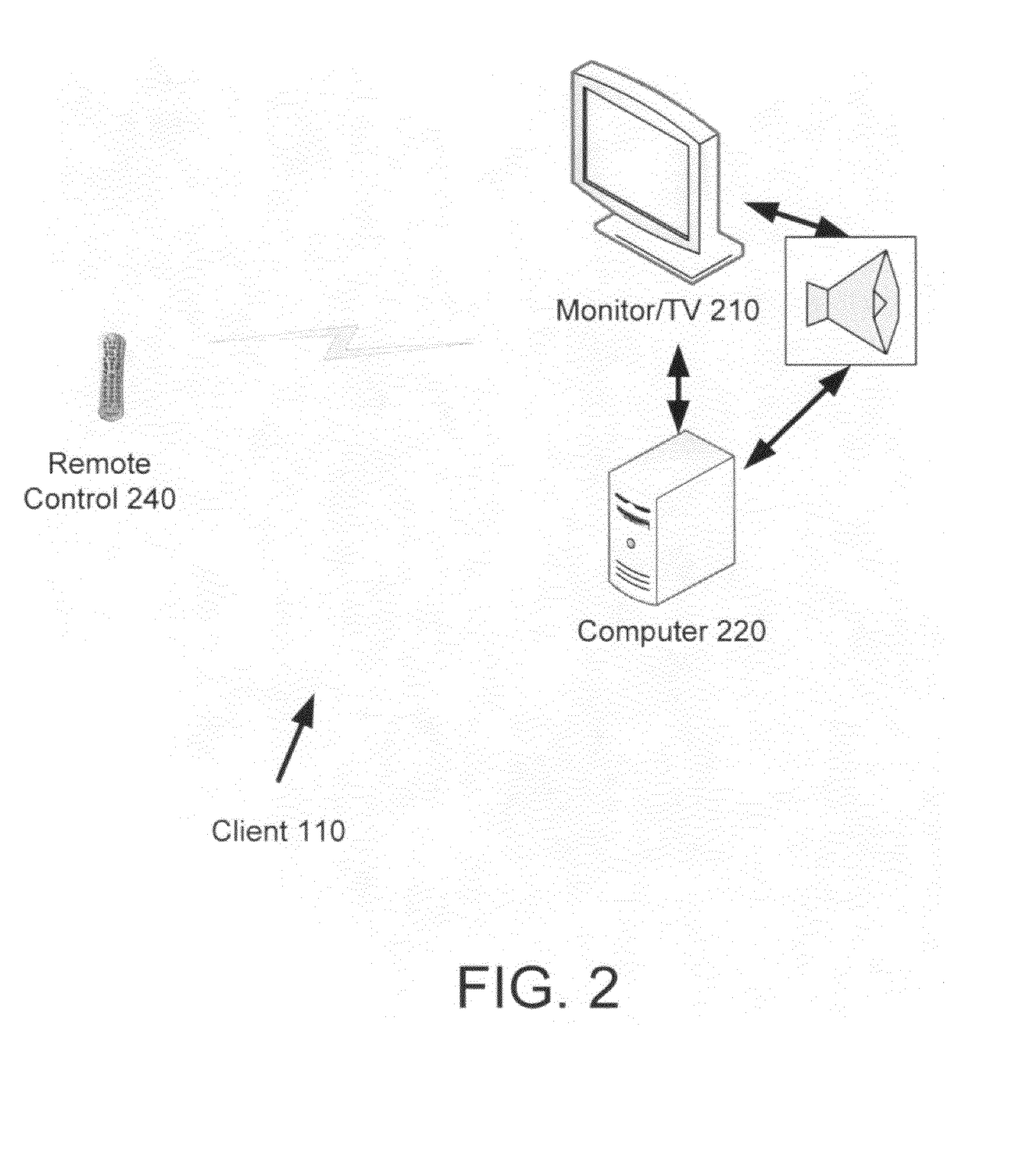
FIG. 2 illustrates an exemplary embodiment of a client in the Audio Data Distribution System.

FIG. 2 illustrates an exemplary embodiment of Client 110. The components of Client 110 may include a display device 210, computing device 220, an audio playing device 230, and a control device 240. Client 110 may include a desktop computer, a laptop computer, a mini-computer, a cell phone, personal digital assistant, or other similar device. Furthermore, Client 110 may include components from a single device or may comprise a combination of separate devices and peripherals.

Display device 210 may be a panel display, such as an LCD, HDTV, etc. Computing device 220 may be any computing and storage device capable of running software for storing, identify and selecting images to create an image collection. Audio playing device 230 may be stereo speakers, or the like which can play audio from the Computing device 220. Finally, Control device 240 may be a remote or wired peripheral capable of controlling the computing device 220 sufficiently for a user to identify and select images for the image collection.

Figure 3:
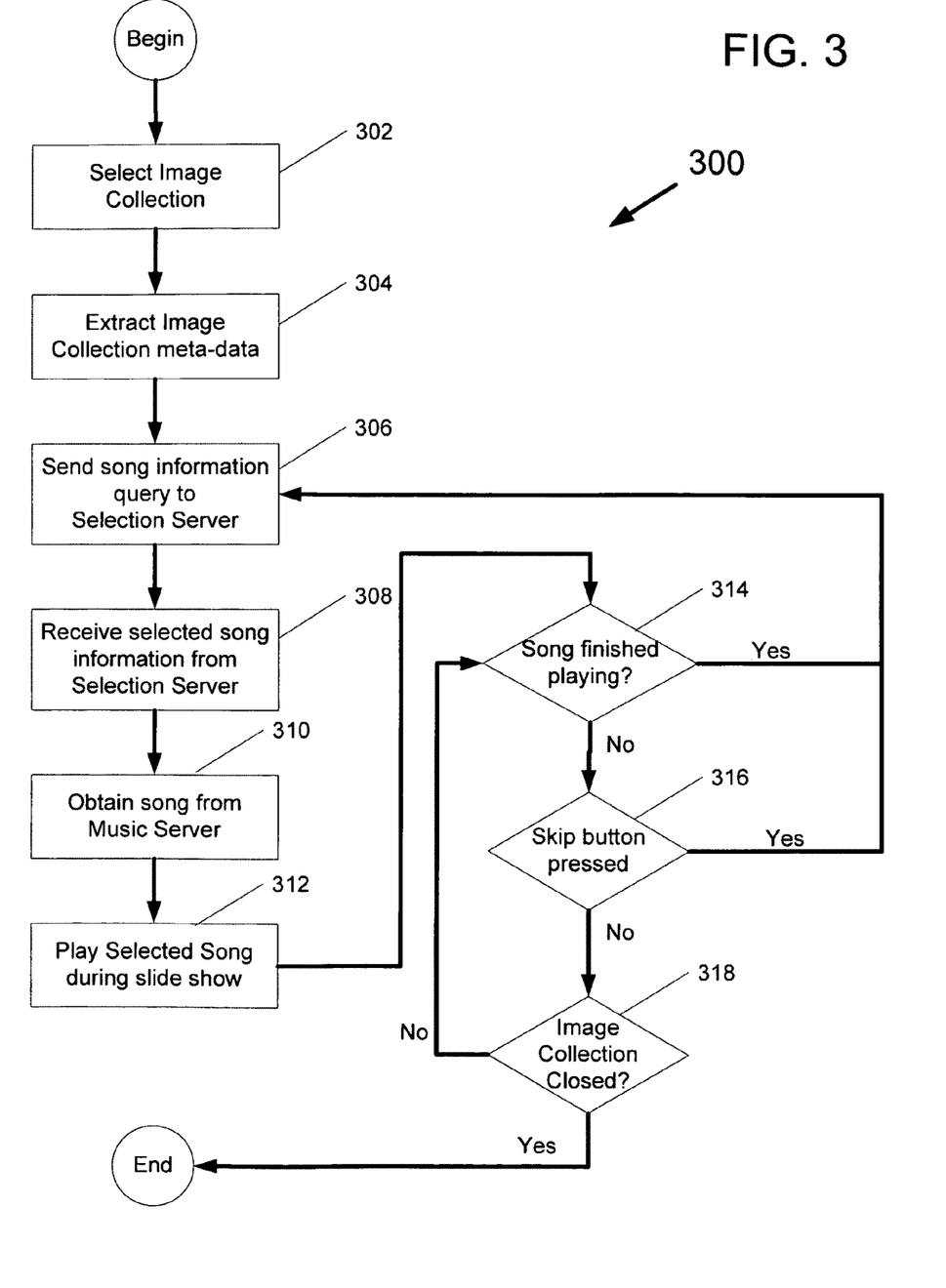
FIG. 3 illustrates an exemplary process by which a client selects images and retrieves audio associated with the image collection.

FIG. 3 illustrates an exemplary process 300 by which Client 110 selects an image collection and retrieves audio associated with the image collection. Process 300 is generally executed prior to and while displaying the image collection selected by the user. Furthermore, process 300 may be performed with respect to any metadata, such as filenames, dates, or location information extracted from the image collection, the process can be performed in relation to any information which can be obtained regarding the selected images or the image collection, as a whole. In fact, process 300 may be performed on every aspect of the metadata fields associated with an image or an image collection, and may be augmented through the use of image analysis and recognition software to create more metadata describing images in the image collection.

In step 302, a user selects an image collection from a pre-existing set of images, which will make up the photo slideshow. The image collection may include one or more images. The image collection may include images from a common location or multiple independent locations. For example, the images may be stored locally at Client 110, may share a common folder, file, drive, etc. or be stored remotely at a location accessible by Client 110. The user of Client 110 may employ image selection software which uses a graphical user interface (GUI), or command line to select the images comprising the image collection. The GUI may be a specially written application for creating the photo slideshow, or may be a plug-in to another application, thereby augmenting a pre-existing application to perform image and audio selection.

In step 304, after the image collection is created, process 300 may extract metadata from the image collection. The metadata may include filenames, folder names, date information, image location (e.g., GPS data), or any pre-existing information that may serve to identify the theme and content of the images. Also, the software at Client 110 may prompt the user to enter metadata, e.g., in the form of keywords, relating to the image collection. Alternatively, the images may be analyzed by image recognition software in an attempt to extract further metadata.

Next, in step 306, the metadata, extracted from the image collection, is sent to the selections server in the form of an audio file information query.

At step 308, Client 110 receives a response from Selection Server 130, in response to the audio file information query. The Selection Server response may include, for example, a URL or unique ID associated with an audio file relating to the subject matter of the image collection.

At step 310, Client 110 connects to the Music Server 130 and retrieves the audio file located at the URL designated by the Selection Server in step 308. In one embodiment, this may involve simply linking to and downloading the audio file from the Music Server, which may be a directory server. Alternatively, step 310 may be a query and response process including querying the Music Server 130 for the audio file, and then receiving the content of the audio file in response to the audio file query.

Once Client 110 obtains the audio file, Client 110 performs step 312, which includes playing the audio file during the slide show.

While the audio file is playing, Client 110 monitors for conditions relating to steps 314, 316, and 318.

In step 314, if Client 110 determines the audio file has finished playing 314, the process returns to step 306 and begins the process of retrieving another audio file by querying the selections server 120 for another audio file; otherwise, process 300 proceeds to step 316.

In step 316, Client 110 determines if the user chose to skip the current audio file. If the user chose to skip the current audio file, the process returns to step 306 and begins the process of retrieving another audio file by querying the selections server 120 for another audio file; otherwise, process 300 proceeds to step 318.

In step 318, Client 110 determines if the photo slideshow application was closed, i.e., Client software is terminated 318, in which case the process 300 ends, otherwise the process returns to monitor for conditions relating to steps 314, 316, and 318.

In an alternative embodiment related to FIG. 3, step 308 may return a playlist containing a series of URLs to a plurality of audio files related to the subject matter of the image collection. In this case, Client 110 may avoid multiple queries to the Selection Server 120 at the conclusion of playing each audio file. In this alternative embodiment, whenever an audio file finishes playing, or the user chooses to skip the playing audio file, Client 110 may select another audio file from the playlist and retrieve it from the Music Server 130.

Figure 4A:
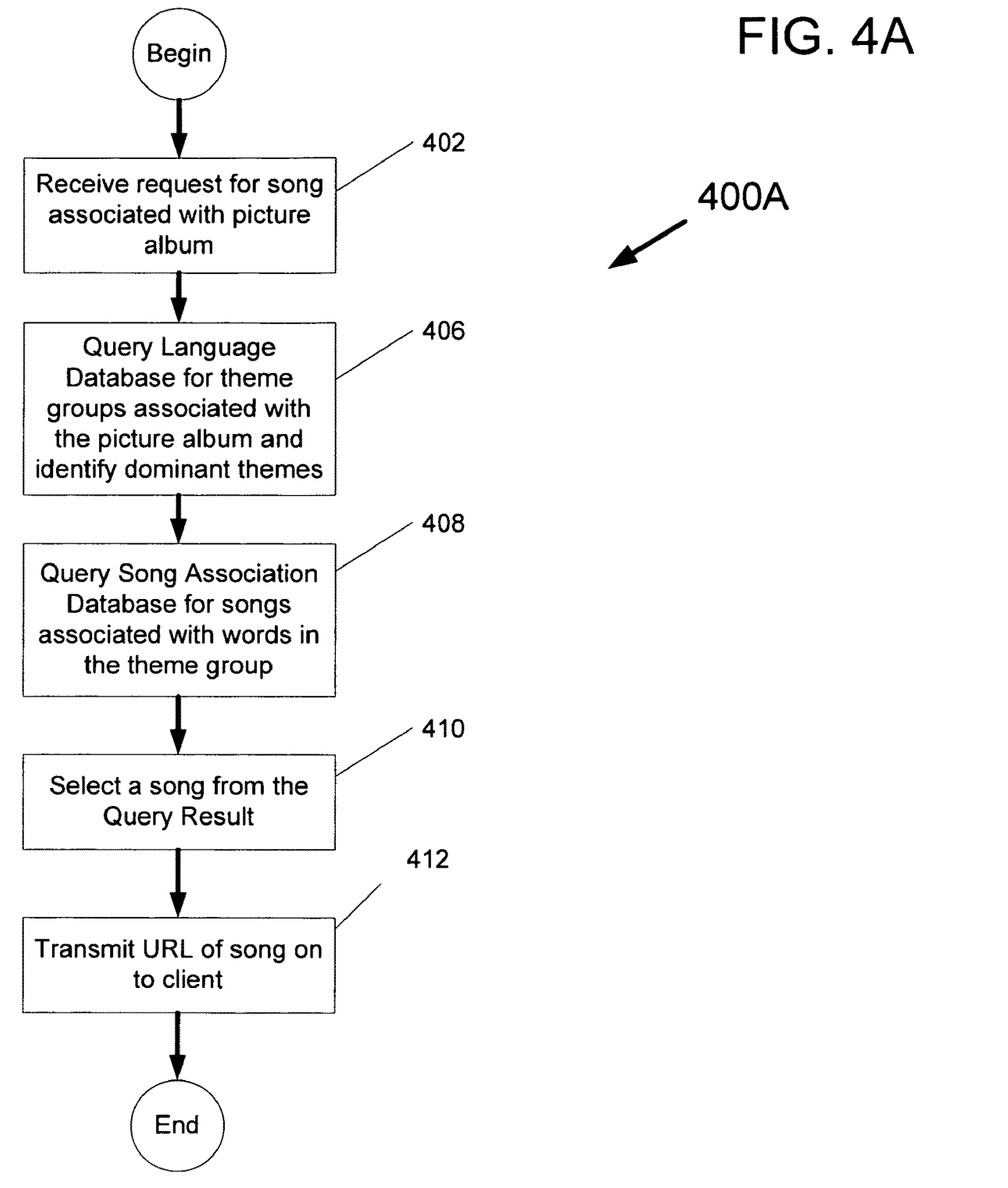
FIGS. 4A and 4B illustrate exemplary processes by which the Selection Server may select audio files and retrieves audio information associated with the image collection.

FIG. 4A illustrates an exemplary process 400A by which the Selection Server 120 selects audio files and retrieves audio associated with the image collection. Process 400A is generally executed in response to the query request made by Client 110 in step 306. Process 400A is generally performed with metadata extracted from the image collection by Client 110. However, process 400A may be performed using any metadata field associated with the image collection, and may be augmented through the use of image analysis and recognition software to create further metadata describing the image content.

Process 400A, begins at step 402, when the Selection Server 120 receives a query from Client 110 containing the metadata extracted from the image collection. As set forth above, the metadata may include filenames, folder names, date information, image location (e.g., GPS data), any pre-existing information that may be stored in metadata associated with the images, data resulting from image analysis, and keywords provided to Client 110 by the user.

At step 406, the Selection Server 120 extracts keywords from within the metadata, queries the Selection Database 125 for theme groups associated with the extracted keywords, and identifies the theme group most descriptive of the image collection.

A theme group is a series of keywords having a related theme between them. A related theme may include, for example, a similar location, subject matter, depicted event, etc. Furthermore, the theme group may include a GPS range to identify related locations. The purpose of identifying a theme group is twofold.

First, the theme group increases the number of keywords which can be used to identify audio files related to the subject matter of the keywords. For example, metadata indicating an image collection of "death valley" may result in a theme group associated with the theme "desert", which may include words such as "desert," "sand," "mirage," "sun," "dunes," "west," "Death Valley," "Mohave," etc. As such, the theme groups serve to increase the universe of potential audio files which may be returned for a given query.

Secondly, a given keyword may be associated with multiple theme groups. For example, the keyword "Nevada" may be associated with one theme group having a gambling theme and another theme group having a desert theme. However, the image collection as a whole may favor one theme over another. That is, if two or more keywords extracted from the metadata are associated with the same theme group, then that theme group can be weighed more heavily when selecting audio files related to the image collection. This helps better identify the common theme for the image collection.

At step 408, the Selection Server 120 queries the Selection Database 125 for audio files that relate to the dominant theme groups identified in step 406. The Selection Database 125 responds to the query by returning a response identifying one or more audio files relating to the dominant theme groups. Each piece of audio file information returned in this query may identify a URL or unique identifier necessary for Client 110 to retrieve the audio file.

At step 410, the Selection Server 120 selects audio information from the response which identifies one audio file. Step 410 may randomly select the audio information or may select the audio file information using a deterministic approach.

At step 412, the Selection Server 120 transmits the audio file information to Client 110.

Figure 4B:
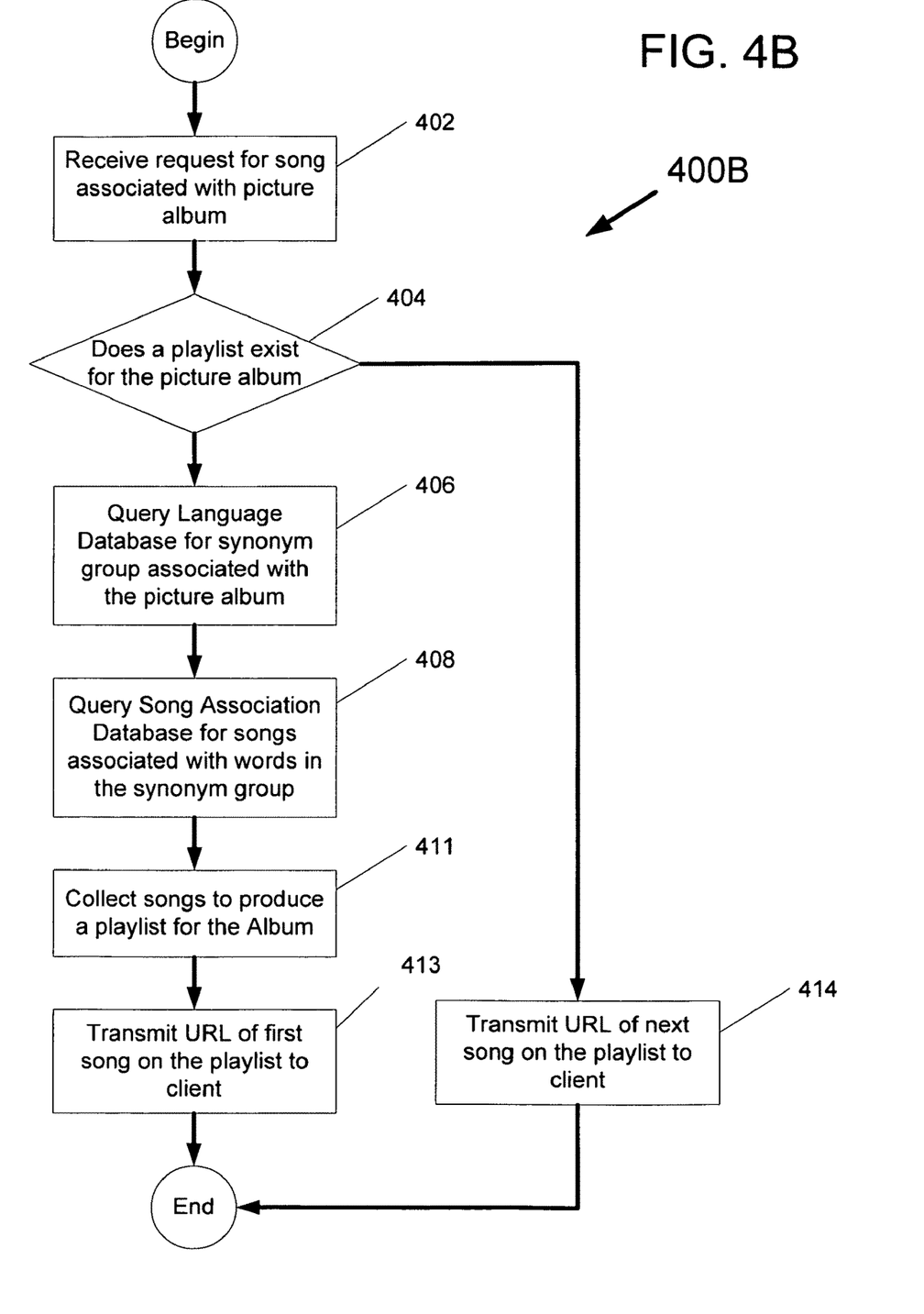

FIG. 4B illustrates an alternative exemplary process 400B by which the Selection Server 120 may select audio files and retrieves audio associated with the images. Process 400B is distinguished from process 400A by the introduction of steps 404, 411, 413, and 414, and the removal of steps 410 and 412. Process 400B reduces the number of queries that Selection Database 125 must make to provide audio file information to Client 110.

In explaining process 400B, only references to unique steps 404, 411, 413, and 414 will be made.

In step 404, Selection Server 120 determines if Selection Server 120 has already created a playlist associated with the image collection and the requesting Client 110. If such a playlist exists, the process moves to step 414, otherwise the process moves to step 406.

At step 414, the Selection Server identifies the last audio file information transmitted to Client 110, and sends Client 110 the next audio file information on the playlist.

Steps 406 and 408 are performed as described above with respect to process 400A.

Step 411 differs from step 410 in that at step 411, one or more audio files identified in step 408 are collected and organized into a playlist which is associated with the image collection and Client 110. This playlist is stored for a predetermined period of time at the server and used in steps 413 and 414.

At step 413, the Selection Server 120 transmits the first audio file information on the playlist to Client 110.

After steps 413 or 414, process 400B ends.

Alternate embodiments of process 400 may, for example, provide the entire playlist created in step 413 to Client 110, thereby removing the need for further communication between Client 110 and Selection Server 120, with respect to a given image collection.

In yet another alternate embodiment, the Selection Server 120 may co-exist with Music Server 130, and at steps 412, 413, or 414, a combined selection and Music Server may directly transmit or stream the audio of one or more audio files to Client 110.

A third alternative embodiment of the present invention may also include a system and method that selects a radio station based on a slideshow. That is, instead of associating a given slideshow with a song or playlist, the system or process may associate the slideshow with a radio station, from a list of radio stations. In such an embodiment, the selection server would be modified to return radio station information, such as a URL or frequency, associated with a radio station. In such an embodiment, once the selection server transmits radio station information to the client, the client may communicate with the radio station identified by the Selection Server 120 and begin downloading and playing music from the radio station.

Since radio stations can be associated with themes, similarly to individual songs, radio station selection mechanism employed by a radios station selection system could be similar to that employed by the processes discussed with respect to FIG. 4A, except that step 413 would transmit radio station identification information instead of song information.

Figure 5:
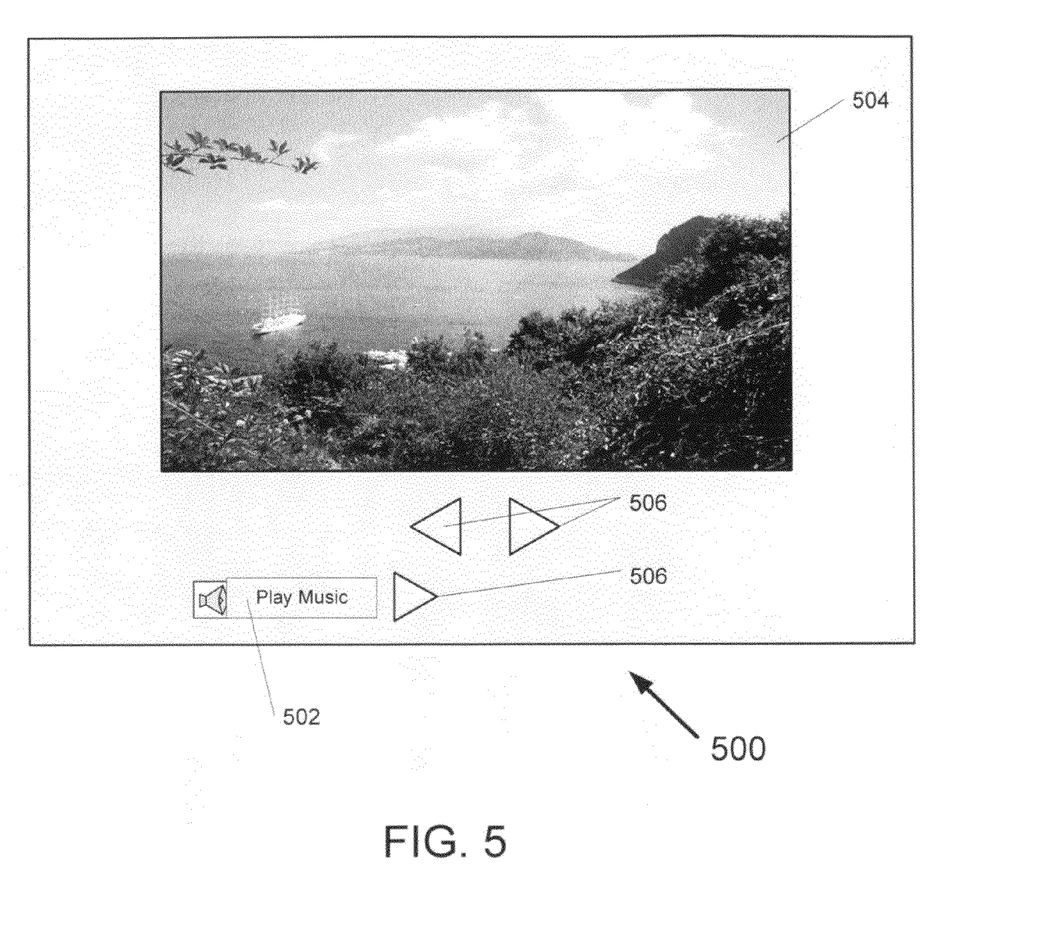
FIG. 5 illustrates an example embodiment of a graphical user interface for the client.

FIG. 5 illustrates an example embodiment of a graphical user interface 500. User interface includes viewing area 504 for viewing the image collection and button controls 506 for traversing through the images. Button control 502 initiates process 400A or 400B to retrieve and play audio files relating to the images displayed in image viewing area 504. Furthermore, control button 506 provides for skip forward functionality for a user to skip past a playing audio file or stream.

Figure 6A:
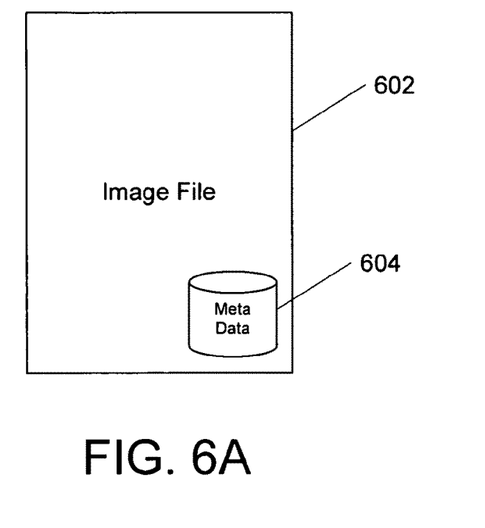
FIGS. 6A-6C illustrate the various embodiments that metadata may be associated with a given image file.
Figure 6B:
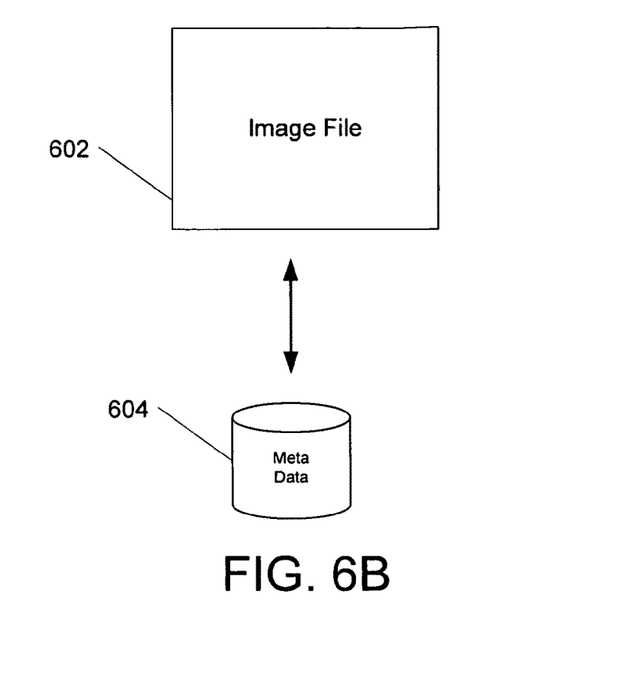
Figure 6C:
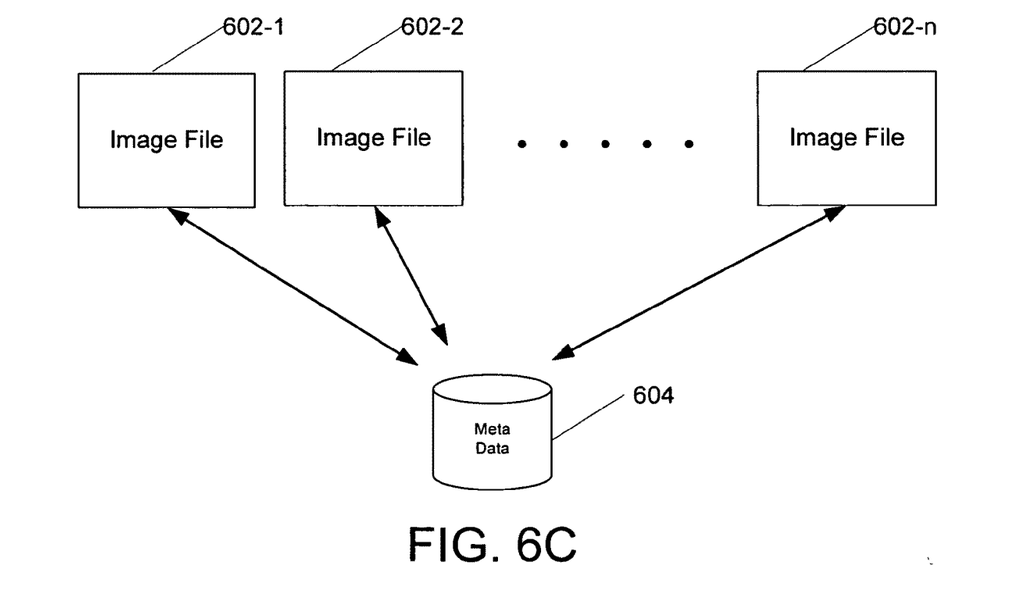

FIGS. 6A-6C illustrate the various embodiments that metadata may be associated with a given image file.

FIG. 6A illustrates an example where the metadata 604 is stored within the image file 602. This metadata may be appended to a known image format such as JPG, GIF, PNG, etc. Alternatively, this may be accomplished by creating a new file format for encapsulating the image and metadata.

In FIG. 6B, the image file 602 is separate from the metadata file 604. However, there is a one-to-one correlation between image files 602 and metadata files 604.

FIG. 6C illustrates an example where metadata for multiple image files 602-1 to 602-n are stored in a single metadata file 604. In this example, the metadata file 604 may be a file, database, or any type of storage capable of storing and distinguishing between metadata for multiple image files 602.

While embodiments herein are discussed primarily with respect to one system embodiment, and three process embodiments, the present invention is not limited thereto. For example, different various types of storage techniques, database systems, and query and response paradigms may be employed in arranging the components of the system method Although embodiments of the invention are discussed primarily with respect to apparatuses and methods for identifying audio files using image metadata, other uses and features are possible. Various embodiments discussed herein are merely illustrative, and not restrictive, of the invention. For example, different server configuration, audio file identification methods and database architectures can change the implementation of the above discussed methods.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Thus embodiments of the present invention produce and provide a system and method for displaying a photo slideshow which automatically selects music. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method for automatically associating background music with an image slideshow, the method comprising:
receiving a selection of an image collection, including at least one image file;
extracting metadata from the image collection to obtain extracted metadata,
associating a radio station with the image collection based upon the extracted metadata, the extracted metadata being used to identify a theme for the image collection that is used as the basis for associating the radio station with the image collection;
generating radio station information including a uniform resource locator and frequency information relative to the radio station based on the theme;
compiling a radio station playlist that includes a set of audio files and audio file information including a unique identifier for each audio file of the set of audio files;
prompting a concurrent playing of the radio station playlist while the image collection is displayed;
storing the radio station information and the audio file information in association with the image collection; and
obtaining an audio file from a location identified in the audio file information.

2. The method of claim 1, further comprising associating keywords in the metadata with a plurality of potential themes based on the metadata, and ranking the plurality of potential themes based on the number of keywords associated with each of the plurality of potential themes.

3. The method of claim 1, further comprising: associating keywords in the metadata with a plurality of potential themes, and identifying a potential theme associated with the largest number of keywords.

4. The method of claim 1, wherein the metadata includes at least three of: at least one file name of the at least one image file, at least one date of the at least one image file, a name of a folder containing the at least one image file, the location depicted in the at least one image file, or the GPS coordinates of the at least one image file.

5. The method of claim 1, further comprising storing the metadata within the at least one image file.

6. The method of claim 1, further comprising storing the metadata in a separate file associated with the at least one image file.

7. The method of claim 1, further comprising storing the metadata for all the image files at a single location that groups metadata associated with each specific image file.

8. A system that automatically associates background music with an image slideshow, the system comprising:
a display device;
an interface for receiving an image collection, including at least one image file;
an extraction module, that extracts metadata from the at least one image in the image collection;
a radio station selection database, including an association module that identifies a theme for the image collection based on the extracted metadata, and uses the theme as the basis for associating a radio station with the image collection;
a radio generator that generates a radio station information including a uniform resource locator and frequency information based on the radio station when query results are received from the radio station selection database and that compiles a radio station playlist including a set of audio files and audio file information including a unique identifier for each audio file of the set of audio files; and
an audio player that concurrently plays the radio station playlist while the image collection is displayed on the display device
a storage device that stores the radio station information and the audio file information in association with the image collection.

9. The system of claim 8, further comprising as association unit that associates keywords in the metadata with a plurality of potential themes, and a ranking unit that ranks the plurality of potential themes based on the number of keywords associated with each of the plurality of potential themes.

10. The system of claim 8, further comprising as association unit that associates each keyword in the metadata with a plurality of potential themes, and identifies a potential theme associated with the largest number of keywords.

11. The system of claim 8, wherein the metadata includes at least three of: at least one file name of the at least one image file, at least one date of the at least one image file, a name of a folder containing the at least one image file, the location depicted in the at least one image file, or the GPS coordinates of the at least one image file.

12. A computer program for automatically associating background music with an image slideshow, stored on at least one non-transitory computer readable medium, that when executed causes a computer to perform the steps of:
receiving an image collection, including at least one image file;
extracting, by a computer, metadata from the image collection to obtain extracted metadata,
associating a radio station with the image collection based upon the extracted metadata, the extracted metadata being used to identify a theme for the image collection that is used as the basis for associating the radio station with the image collection;
generating radio station information including a uniform resource locator and frequency information relative to the radio station based on the theme;
compiling a radio station playlist that includes a set of audio files and audio file information including a unique identifier for each audio file the set of audio files;

prompting a playing of the radio station playlist while the image collection is displayed;

storing the radio station information and the audio file information in association with the image collection; and obtaining an audio file from a location identified in the audio file information.

13. The computer program stored on at least one computer readable medium of claim 12, further comprising producing an audio file list based on the theme.

14. The computer program stored on at least one computer readable medium of claim 12, further comprising associating keywords in the metadata with a plurality of potential themes based on the metadata, and ranking the plurality of potential themes based on the number of keywords associated with each of the plurality of potential themes.

15. The computer program stored on at least one computer readable medium of claim 12, further comprising associating keyword in the metadata with a plurality of potential themes, and identifying a potential theme associated with the largest number of keywords.

16. A method for automatically associating background music with an image slideshow, the method comprising:

receiving a selection of an image collection, including at least one image file;

extracting location information based on GPS coordinates associated with mapping information of the at least one image file from the image collection to obtain extracted metadata, associating a radio station with the image collection based upon the extracted metadata, the extracted metadata being used to identify a theme for the image collection that is used as the basis for associating the radio station with the image collection;

generating radio station information including a uniform resource locator and frequency information based on the theme;

compiling a radio station playlist that includes a set of audio files and audio file information including a unique identifier for each audio file of the set of audio files;

prompting a playing of the radio station playlist while the image collection is displayed;

storing the audio file information and the radio station information in association with the image collection; and obtaining an audio file using unique client identifiers in the audio file information.

\* \* \* \* \*